(12) United States Patent
Larsson et al.

(10) Patent No.: US 11,160,115 B2
(45) Date of Patent: Oct. 26, 2021

(54) SETTING OF BACK-OFF TIME

(71) Applicant: Convida Wireless, LLC, Wilmington, DE (US)

(72) Inventors: Bo Larsson, Malmö (SE); Anders Berggren, Lund (SE); Rickard Ljung, Helsingborg (SE)

(73) Assignee: Convida Wireless, LLC, Wilmington, DE (US)

( * ) Notice: Subject to any disclaimer, the term of this patent is extended or adjusted under 35 U.S.C. 154(b) by 1 day.

(21) Appl. No.: 16/495,742

(22) PCT Filed: Mar. 23, 2018

(86) PCT No.: PCT/EP2018/057508
§ 371 (c)(1),
(2) Date: Sep. 19, 2019

(87) PCT Pub. No.: WO2018/172539
PCT Pub. Date: Sep. 27, 2018

(65) Prior Publication Data
US 2020/0100293 A1    Mar. 26, 2020

(30) Foreign Application Priority Data
Mar. 24, 2017    (EP) ..................................... 17162865

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0053* (2013.01); *H04W 28/0215* (2013.01);
(Continued)

(58) Field of Classification Search
CPC ......... H04W 74/0833; H04W 28/0215; H04W 48/02; H04W 74/006; H04W 74/008; H04W 4/70; H04W 74/08; H04L 5/0053
(Continued)

(56) References Cited

U.S. PATENT DOCUMENTS

2011/0274040 A1 * 11/2011 Pani ..................... H04W 74/006
370/328
2012/0155310 A1 * 6/2012 Kreuzer .............. H04W 52/262
370/252
(Continued)

FOREIGN PATENT DOCUMENTS

| WO | 2011/100540 A1 | 8/2011 |
| WO | 2015119548 A1 | 8/2015 |
| WO | 2016164148 A1 | 10/2016 |

OTHER PUBLICATIONS

International Search Report and Written Opinion from corresponding International Patent Application No. PCT/EP2018/057508, dated May 30, 2018, 15 pages.
(Continued)

*Primary Examiner* — Kwang B Yao
*Assistant Examiner* — Syed M Bokhari
(74) *Attorney, Agent, or Firm* — BakerHostetler

(57) ABSTRACT

A method includes setting the back-off time duration (501, 501-1-501-4) based on a count (352, 352-1-352-4) of multiple repetitions (351) of a signal (401-403, 411, 6001), wherein transmission of the multiple repetitions (251) of the signal is allowed after the back-off time duration.

19 Claims, 11 Drawing Sheets

(51) Int. Cl.
   *H04W 28/02* (2009.01)
   *H04W 48/02* (2009.01)
   *H04W 74/00* (2009.01)
(52) U.S. Cl.
   CPC ......... *H04W 48/02* (2013.01); *H04W 74/006* (2013.01); *H04W 74/008* (2013.01)
(58) Field of Classification Search
   USPC ................................ 370/328, 329, 336, 252
   See application file for complete search history.

(56) References Cited

U.S. PATENT DOCUMENTS

| | | | |
|---|---|---|---|
| 2012/0275378 A1* | 11/2012 | Lee | H04L 27/28 370/328 |
| 2016/0192392 A1* | 6/2016 | Park | H04W 72/085 370/336 |
| 2016/0205661 A1* | 7/2016 | Ryu | H04W 36/30 455/458 |
| 2017/0231011 A1* | 8/2017 | Park | H04W 74/006 |
| 2018/0139761 A1* | 5/2018 | Park | H04W 24/08 |
| 2018/0270867 A1* | 9/2018 | Yi | H04W 74/006 |
| 2020/0396771 A1* | 12/2020 | Liu | H04W 72/0413 |

OTHER PUBLICATIONS

Huawei et al., "Consideration on RACH procedure in coverage enhancement", 3GPP Draft; R2-152232, May 15, 2015, 4 pages.
Communication pursuant to Article 94(3) EPC, dated Oct. 6, 2020, issued in corresponding European Patent Application No. 18 711 594.4.

* cited by examiner

SETTING OF BACK-OFF TIME

TECHNICAL FIELD

Various examples of embodiments herein relate to setting a back-off time duration in communication networks.

BACKGROUND

It is expected that Third Generation Partnership Project (3GPP) machine-type-communication (MTC) will evolve in two directions; Critical MTC (cMTC) and Massive MTC (mMTC). cMTC will focus on high reliability, high availability and low latency, e.g. industrial applications. mMTC will instead address use cases where a very large number such as tens of billions of less data-performance critical terminals (UEs) connects to the network, combined with low UE cost and low power consumption/good battery life. Examples include sensor UEs.

A massive number of UEs sending small pieces of payload data, as in the case of mMTC, exhibits a significantly different traffic pattern compared to "traditional" wireless communication where the payload data accounts for the majority of the network load. For MTC, the challenge will thus be to provide sufficiently scalable and efficient solutions to handle the massive amount of connections. Such solutions must also account for flooding scenarios, i.e., when a large amount of UEs attempts to connect simultaneously or almost simultaneously.

3GPP, for the Long Term Evolution (LTE) protocol, has specified mechanisms that can be used during the random access (RA) procedure to mitigate the flooding scenario. These provide the evolved Node B (eNB) base station (BS) with two options to distribute the load. As a first (reactive) option, the eNB may issue a Random Access Response (RAR) with a back-off indicator that instructs the UE to back off for a period of time (back-off time duration) before retrying an RA attempt. As a second option, the eNB may request the UEs to accept a longer time to elapse between sending the RA preamble and receiving the RAR, allowing the eNB some additional time to process the preambles. In the latter case the UEs are configured via System Information Broadcast (SIB) signaling.

In addition to the mechanisms pertaining to the RA procedure, various forms of access-barring (AB) mechanisms are also specified in order to restrict UE:s to initiate connection request procedure, namely:

(I) Access-class barring (ACB) and extended ACB: A specific broadcasted barring indicator can be set in broadcasted system information. The barring can be made for a certain group of UEs, where each UE typically belongs to a group number from 0 to 9 depending on their subscriber identity (IMSI). If such barring indicator is set, a UE belonging to such barred group will not be allowed to initiate a connection request by means of a RA message. Extended ACB is a separate indicator that specifically bars connection requests for IoT traffic.

(II) Service Specific Access Control (SSAC): Since voice in LTE (VoLTE) is a packet-switched service, a normal ACB control would restrict both data and voice calls. In order to possibly allow VoLTE service although other services are barred a specific broadcasted barring indicator to control voice calls over packet switched services has been included in 3GPP.

(III) Smart Congestion Mitigation (SCM): Similarly to SSAC a service indicator may be included in broadcast message to identify whether VoLTE, ViLTE and/or SMS are allowed to override an ACB barring.

(IV) Access Control for general Data Connectivity (ACDC): Allows priority handling for individual applications by means of categorizing the applications in a UE, and corresponding barring information in the broadcasted system information.

Such techniques of RA back-off and ACB face certain restrictions and drawbacks. For example, barring solutions mentioned above completely stop access attempts for all UEs identified by the barring mechanism. This means that barred UEs are awaiting the barring indicator to be removed from the system information. Such a technique is comparably static and may impose long connection attempt delays for barred UE:s. Also it may require significant control signaling.

SUMMARY

Therefore, a need exists for advanced techniques of transmission of signals. In particular, need exists for advanced techniques of transmission of signals employing CE.

This need is met by the features of the independent claims. The features of the dependent claims define further embodiments.

A method performed by a wireless communications device for setting a back-off time duration includes setting the back-off time duration based on a count of multiple repetitions of a signal. The transmission of the multiple repetitions of the signal is allowed after the back-off time duration.

In some examples, the transmission of the multiple repetitions of the signals may be prohibited during the back-off time duration.

In some examples, the method may further comprise transmitting the multiple repetitions of the signal after the back-off time duration.

A computer program product includes program code to be executed by at least one processor. Executing the program code causes the at least one processor to perform a method. The method includes setting the back-off time duration based on a count of multiple repetitions of a signal. The transmission of the multiple repetitions of the signal is allowed after the back-off time duration.

A computer program includes program code to be executed by at least one processor. Executing the program code causes the at least one processor to perform a method. The method includes setting the back-off time duration based on a count of multiple repetitions of a signal. The transmission of the multiple repetitions of the signal is allowed after the back-off time duration.

A device includes control circuitry which configured to set a back-off time duration based on a count of multiple repetitions of a signal, wherein transmission of the multiple repetitions of the signal is allowed after the back-off time duration.

In an example, the method may further include transmitting further multiple repetitions of the signal or transmitting multiple repetitions of a further signal. The method may further include detecting at least one failure event in response to said transmitting of the further multiple repetitions of the signal or said transmitting of the multiple repetitions of the further signal. In response to said detecting of the failure event, the multiple repetitions of the signal are transmitted after the back-off time duration.

Hence, it may be possible that the further multiple repetitions of the signal are transmitted prior to the multiple repetitions of the signal. Likewise, it is possible that the multiple repetitions of the further signal are transmitted prior to the multiple repetitions of the signal.

In some examples, it may be possible that the signal and the further signal are different from each other. Yet, in other examples, it may also be possible that the signal and the further signal correspond to each other or are equal.

Sometimes, the further signal may be labeled first signal, because the multiple repetitions of the further signal may be transmitted prior to the multiple repetitions of the signal. Sometimes, the further multiple repetitions of the signal may be labeled first multiple repetitions of the signal and the multiple repetitions of the signal may be labeled second multiple repetitions of the signal, because the further multiple repetitions of the signal may be transmitted prior to the multiple repetitions of the signal.

A method includes transmitting multiple repetitions of a first signal. The method further includes detecting at least one failure event in response to said transmitting of the multiple repetitions of the first signal. The method further includes transmitting multiple repetitions of a second signal or transmitting further multiple repetitions of the first signal after a back-off time duration. The method further includes setting the back-off time duration based on at least one of a count of the multiple repetitions of the first signal and a count of the multiple repetitions of the second signal.

A computer program product includes program code to be executed by at least one processor. Executing the program code causes the at least one processor to perform a method. The method includes transmitting multiple repetitions of a first signal. The method further includes detecting at least one failure event in response to said transmitting of the multiple repetitions of the first signal. The method further includes transmitting multiple repetitions of a second signal or transmitting further multiple repetitions of the first signal after a back-off time duration. The method further includes setting the back-off time duration based on at least one of a count of the multiple repetitions of the first signal and a count of the multiple repetitions of the second signal.

A computer program includes program code to be executed by at least one processor. Executing the program code causes the at least one processor to perform a method. The method includes transmitting multiple repetitions of a first signal. The method further includes detecting at least one failure event in response to said transmitting of the multiple repetitions of the first signal. The method further includes transmitting multiple repetitions of a second signal or transmitting further multiple repetitions of the first signal after a back-off time duration. The method further includes setting the back-off time duration based on at least one of a count of the multiple repetitions of the first signal and a count of the multiple repetitions of the second signal.

A device includes control circuitry. The control circuitry is configured to transmit multiple repetitions of a first signal and to detect at least one failure event in response to said transmitting of the multiple repetitions of the first signal. The control circuitry is further configured to transmit multiple repetitions of a second signal or to transmit further multiple repetitions of the first signal after a back-off time duration. The device is further configured to set the back-off time duration based on at least one of a count of the multiple repetitions of the first signal and a count of the multiple repetitions of the second signal.

By such techniques, it is possible to mitigate flooding scenarios, e.g., if multiple devices attempt to connect to a network contemporaneously.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
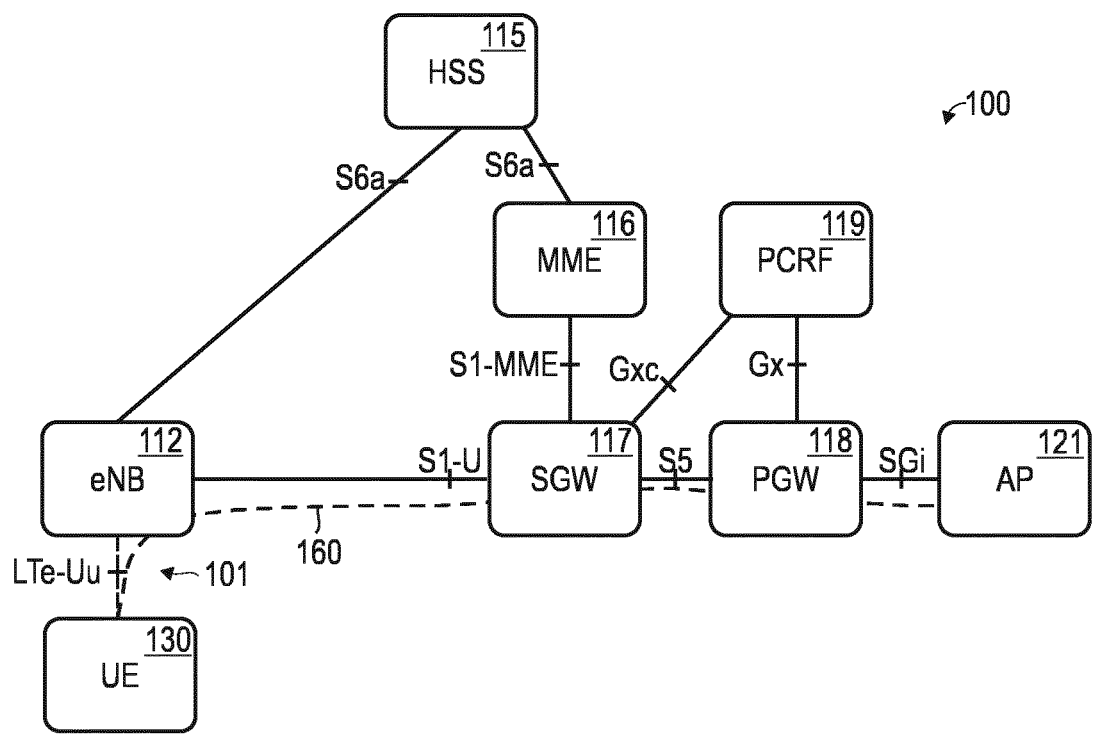
FIG. 1 schematically illustrates a cellular network including a wireless link according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of transmitting and/or receiving (communicating) encoded signals between a first device and a second device of a network, such as a wireless network, are disclosed.

For example, the signals may correspond to payload data of applications implemented by the first device and/or the second device. Alternatively or additionally, the signals may correspond to control data, e.g., Layer 2 or Layer 3 control data according to the Open Systems Interface (OSI) model. Alternatively or additionally, the signals may correspond to an RA preamble of a RA procedure of a UE attaching to a wireless network.

According to various examples, the signals may correspond to uplink (UL) data. For example, the signals may correspond to UL data transmitted from a UE to a BS. In other examples, device-to-device (D2D) wireless communication on a sidelink of the wireless link of the network between two UEs could be employed. Also, downlink (DL) data could be transmitted.

Sometimes, a signal may be transmitted and then—e.g., after a back-off time duration—the same signal may be re-transmitted, e.g., using multiple repetitions each time. Yet, it is also possible that a first signal is transmitted and then—after the back-off time duration—a second signal which may be different from the first signal is transmitted, e.g., using multiple repetitions each time.

Network traffic is expected to increase in view of a set of features where a comparably large coverage is achieved and referred to as Coverage Enhancement (CE). CE is envisioned to be applied for MTC and the Narrowband IoT (NB-IOT), sometimes also referred to as NB-LTE. CE may also be applied to new technologies for MTC, such as mMTC concept. For example, such techniques may be based on the 3GPP LTE technology to some extent and may reuse some of the LTE concepts. A key feature of the CE is to implement multiple transmission repetitions of a signal, e.g., corresponding to encoded data or a RA preamble. Here, each repetition may include the same redundancy version of the encoded data. The repetitions may be "blind", i.e., may not be in response to a respective retransmission request that may be defined with respect to a Hybrid Acknowledgment Repeat Request protocol (HARQ protocol). Rather, repetitions according to CE may be preemptive. Examples are provided by the 3GPP Technical Report (TR) 45.820 version 13.0.0 (2015 August), section 6.2.1.3. By employing CE, a likelihood of successful transmission can be increased even in scenarios of poor conditions of communicating on a corresponding wireless link. Thereby, the coverage of networks can be significantly enhanced—even for low transmission powers as envisioned for the MTC and MB-IoT domain.

Due to the multiple repetitions of the signals, it is expected that network traffic further increases. In particular in connection with RA procedures, this can cause congestion and negative impacts on the load imposed on the BSs, and other network loads.

According to examples, a signal is redundantly communicated using a plurality of repetitions. The signal may be encoded according to one and the same redundancy version: Hence, the same encoded version of the signal may be redundantly communicated a number of times according to various examples. Each repetition of the plurality of repetitions can include the signal encoded according to the same redundancy version, e.g., redundancy version 0 or redundancy version 1, etc. Then, it is possible to combine the plurality of repetitions of the encoded signal at the receiver side. Such combination may be implemented in analog or digital domain, e.g., in the baseband. The combination yields a combined signal. Then, the decoding of the encoded signals can be based on the combined signal. Thus, by aggregating the received information across the multiple repetitions, the probability of successfully decoding of the encoded signal increases. This facilitates CE. The count of repetition is sometimes referred to as the CE level. Such techniques of CE may find particular application in the framework of the IoT technology, e.g., according to 3GPP MTC or NB-IoT. Here, typically, the transmitting UE implements a comparably low transmit power. Due to the multiple repetitions of the encoded signal, nonetheless, a sufficiently high likelihood of successfully receiving and decoding the encoded signal is provided for according to various examples, high network load situations are handled by using a back-off technique. Here, a device attempting to transmit multiple repetitions of signal may implement a back-off time duration. According to examples, the back-off time duration is set based on the CE level.

In some examples, the back-off time duration may be triggered by a failure event, e.g., a failed connection attempt or collision. In further examples, the back-off time duration may be triggered by a change in an AB state, e.g., from barred to un-barred. For example, a time monitoring lapse of the back-off time duration may be initialized in response to the failure event and/or the change in the AB state. Then, the timer may countdown after being initialized to trigger subsequent transmissions.

By setting the back-off time duration based on the CE level, an extra challenge to the network due to the usage of CE can be mitigated.

Such a CE level-dependent back-off time duration may be employed in various use cases. One example application relates to the RA procedure of a UE attempting to connect to a network. In such a use case, the CE level-dependent back-off time duration enables the network to defer connection requests, e.g., from UEs using high counts of repetitions/high CE levels for a longer period of time if compared to connection requests from such UEs which employ a lower CE level. This approach is based on the finding that a drawback of repeating signals is its negative impact on network load. The different physical channels in the LTE system may have different CE levels. Signals may be repeated up to 2048 times, see 3GPP Technical Specification (TS) 36.213, section 16.4.1.3, implying that the load impact can be significant. In flooding scenarios, it thus helps to take the CE level into account when prioritizing among UEs that make access attempts. Such prioritization may maximize the number of UEs that successfully can connect. Thereby, the network load can be evened out over time. Furthermore, load peaks can be mitigated, e.g., in response to lifting an AB when multiple UEs attempt to connect to the network.

A further use case for the CE level-dependent back-off time duration relates to transmission on unlicensed bands. An unlicensed band may reside in an open spectrum. Multiple operators or networks may share access to the open spectrum. In other words, access to the open spectrum may not be restricted to a single operator or network. Typically, the wireless communication on the open spectrum may involve listen before talk LBT procedures and/or back-off procedures. Such techniques are sometimes also referred to as Carrier Sense Multiple Access/Collision Avoidance (CSMA/CA).

Generally, in the various examples described herein, the CE-level-based back-off time duration may be activated for certain types of UEs, e.g. for specific UE categories. Here, no explicit signaling to activate the CE-level-based back-off time duration may be required. Instead, the CE-level-based back-off time duration may be always used for certain types of UE:s, e.g. in the event of a failed RA attempt or in response to a change in the AB state. Alternatively or additionally, the network can activate the CE-level-based back-off time duration by system information broadcast (SIB). Here, certain configuration parameters for the CE-level-based back-off time duration may be included in the SIB.

FIG. 1 illustrates the architecture of a cellular network 100 according to some examples implementations. In particular, the cellular network 100 according to the example of FIG. 1 implements the 3GPP LTE architecture, sometimes referred to as evolved packet system (EPS). This, however, is for exemplary purposes only. In particular, various scenarios will be explained in the context of a wireless link 101 between a UE 130 and the cellular network 100 operating according to the 3GPP LTE radio access technology for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. The techniques may also find application for the upcoming 3GPP 5G New Radio, e.g., using carrier frequencies up to 60 GHz.

A further particular examples is 3GPP MTC. The respective network architecture may be based on the architecture of the example of FIG. 1, e.g., re-use certain functionality and/or nodes.

Other examples include other types of networks, e.g., Institute of Electrical and Electronics Engineers (IEEE) 802.11X Wireless Local Area Network, Bluetooth or Zigbee.

The 3GPP LTE RAT implements a HARQ protocol. The HARQ protects signals communicated via the wireless link 101. FEC and retransmission are employed in this respect.

The UE 130 is connected via the wireless link 101 to a BS 112 of the cellular network 100. The BS 112 and the UE 130 implement the evolved UMTS terrestrial radio access technology (E-UTRAN); therefore, the BS 112 is labeled eNB in FIG. 1.

For example, the UE 130 may be selected from the group including: a smartphone; a cellular phone; a table; a notebook; a computer; a smart TV; a MTC device, an IoT device; a sensor; an actuator; etc.

An MTC or IoT device is typically a device with a low to moderate requirement on data traffic volumes and loose latency requirements. Additionally, wireless communication employing MTC or IoT devices should achieve low complexity and low costs. Further, energy consumption of an MTC or an IoT device should be comparably low in order to allow battery-powered devices to function for a comparably long duration: The battery life should be sufficiently long. For example, the IoT device may be connected to a core network such as the EPS via a radio network such as the NB-IoT RAT.

Wireless communication on the wireless link 101 can be in UL and/or DL direction. Details of the wireless link 101 are illustrated in FIG. 2.

Figure 2:
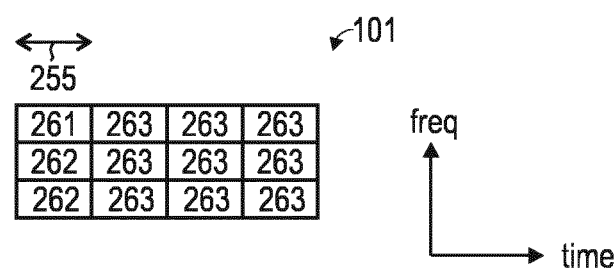
FIG. 2 schematically illustrates resources on the wireless link of the cellular network according to various examples.

FIG. 2 illustrates aspects with respect to channels implemented on the wireless link. The wireless link 101 implements a plurality of wireless communication channels 261-263. Transmission frames 255—e.g., implemented by subframes—of the channels 261-263 occupy a certain time duration. Each channel 261-263 includes a plurality of resources which are defined in time domain and frequency domain. For example, the resources may be defined with respect to symbols encoded and modulated according to Orthogonal Frequency Division Multiplexing (OFDM).

For example, a first channel 261 may carry synchronization signals which enable the BS 112 and the UE 130 to synchronize wireless communication on the wireless link 101 in time domain.

A second channel 262 may be associated with control messages (control channel 262). The control messages may configure operation of the UE 130, the BS 112, and/or the wireless link 101. For example, radio resource control (RRC) messages and/or HARQ ACKs and NACKs can be exchanged via the control channel. According to the E-UTRAN RAT, the control channel 262 may thus correspond to a Physical DL Control Channel (PDCCH) and/or a Physical UL Control Channel (PUCCH) and/or a Physical Hybrid ARQ indicator Channel (PHICH). The second channel may be allocated to RA preambles communicated in a RA procedure.

Further, a third channel 263 is associated with a payload messages carrying higher-layer user-plane data packets associated with a given service implemented by the UE 130 and the BS 112 (payload channel 263). According to the E-UTRAN RAT, the payload channel 263 may be a Physical DL Shared Channel (PDSCH) or a Physical UL Shared Channel (PUSCH).

In some examples, it is possible that at least some of the resources reside—at least partly or fully—in an open spectrum. Then, it is possible that the UE 130 and/or the BS 112 performs a LBT procedure and a back-off procedure when transmitting signals on the respective channels 261-263.

Turning again to FIG. 1, the BS 112 is connected with a gateway node implemented by a serving Gateway (SGW) 117. The SGW 117 may route and forward payload data and may act as a mobility anchor during handovers of the UE 130.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 1): for this purpose, the PGW 118 is connected with an access point node 121 of the packet data network. The access point node 121 is uniquely identified by an access point name (APN). The APN is used by the UE 130 to seek access to the packet data network.

The PGW 118 can be an endpoint of an end-to-end connection 160 for packetized payload data of the UE 130. The end-to-end connection 160 may be used for communicating data of a particular service. Different services may use different end-to-end connections 160 or may share, at least partly, a certain end-to-end connection.

The end-to-end connection 160 may be implemented by one or more bearers which are used to communicate service-specific data. An EPS bearer which is characterized by a certain set of quality of service parameters indicated by the QoS class identifier (QCI).

Figure 3:
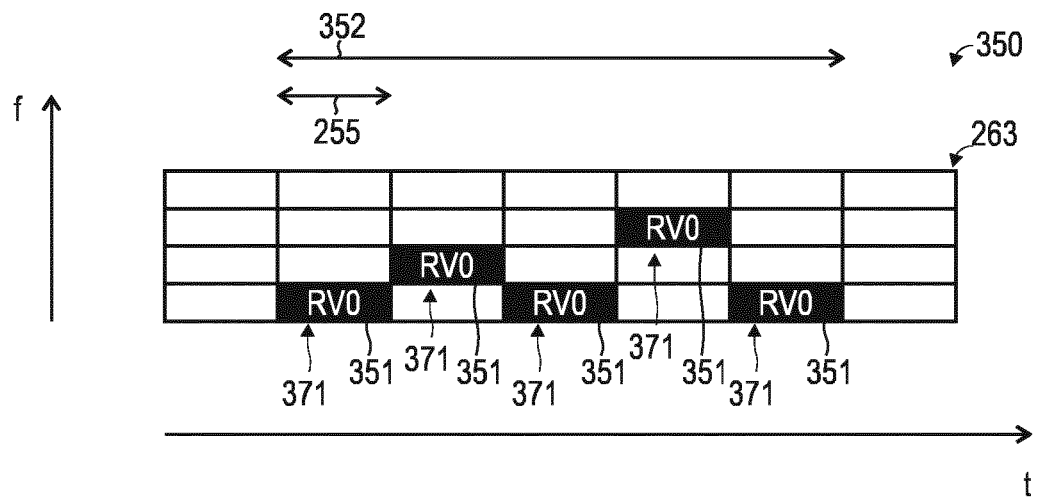
FIG. 3 schematically illustrates transmission of multiple repetitions of an encoded signal for CE according to various examples.

FIG. 3 illustrates aspects with respect to CE. In particular, FIG. 3 illustrates aspects with respect to a burst 350 including multiple repetitions 351 of a signal encoded according to a redundancy version 371. As can be seen from FIG. 3, the plurality of repetitions 351 are communicated in subsequent subframes 255 of the channel 263. The transmission burst 350 of the repetitions 351 has a certain duration, which defines a CE level 352, i.e., a count of the repetitions 351. The CE level may be predefined, e.g., depending on a device type of the UE 130 and/or based on control signaling from the network, and/or based on measured properties of the wireless radio link 121. The CE level 352 may be defined in accordance with a CE policy.

While in the scenario of FIG. 3 the transmission burst 350 includes subsequent repetitions 350 of the encoded signal in subsequent subframes 255, in other examples, it is also possible that subsequent repetitions are not arranged contiguously with respect to the subframes 255, i.e., there may be intermittent subframes not occupied by a repetition of the encoded signal of the transmission burst (not shown in FIG. 3). In other examples it would be possible that subsequent repetitions 350 are arranged within a single subframe 255 (not shown in FIG. 3).

The specific time-frequency arrangement of the repetitions 351 is illustrated in the example of FIG. 3 is an example only. Other examples are possible.

While in the scenario of FIG. 3 encoded signal is communicated on the payload channel 263, similar techniques may be readily applied to other kinds and type of signals, e.g., control data or RA preambles.

Figure 4:
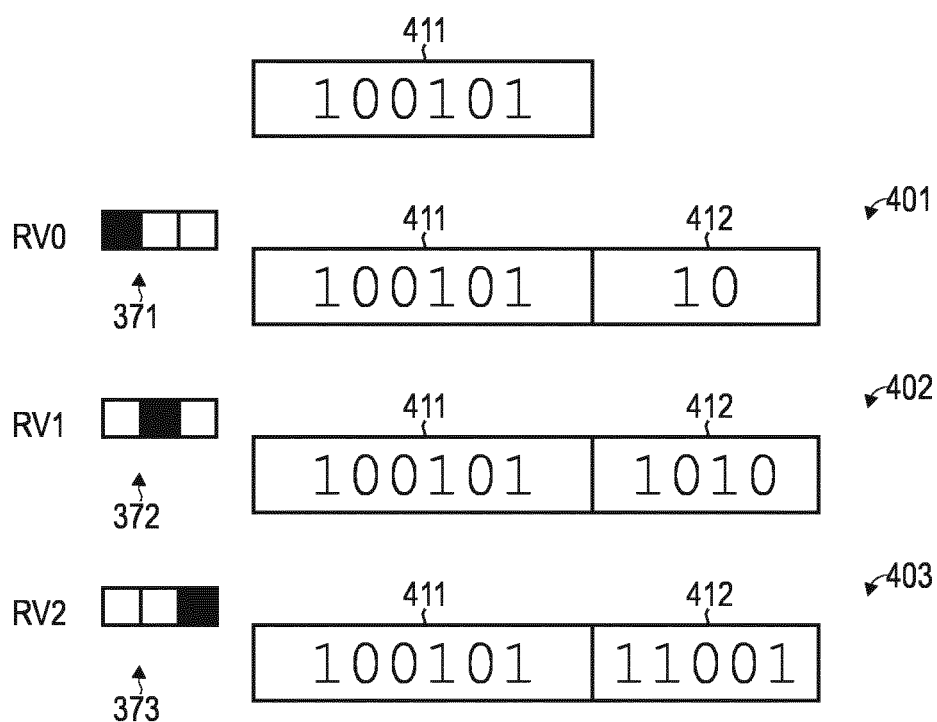
FIG. 4 schematically illustrates encoding of the signal according to different redundancy versions and according to various examples.

FIG. 4 illustrates aspects of encoding signals 401-403 according to different redundancy versions 371-373. As can be seen from FIG. 4, the raw signal 411 includes a sequence of bits. For example, the signal 411 can correspond to a data packet, e.g., a MAC layer Service Data Unit (SDU). It would also be possible that the signal 411 corresponds to a RRC command or other control data such as a ACK, NACK, UL grant, or DL assignment.

Encoding the signal 411 can correspond to adding a checksum 412 to the signal 411 to yield the encoded signal 401-403.

Different techniques of encoding can be employed such as, e.g., Reed Solomon encoding, turbo convolutional encoding, convolutional coding, polar coding, etc. Provisioning the checksum 412 can facilitate reconstruction of corrupted bits of the corresponding message 401-403 according to the coding scheme. Typically, the longer (shorter) the checksum 412, the more (less) robust the wireless communication of the corresponding message 401-403 against noise and channel imperfections; thus, a probability for successful transmission of the signal 411 can be tailored by the length of the checksum. Alternatively or additionally, encoding the signal can correspond to applying interleaving where the bits of the signal 411 are shuffled (not shown in FIG. 4).

Typically, different redundancy versions 371-373 correspond to checksums 412 of different length (as illustrated in FIG. 4). In other examples, it would also be possible that different redundancy version 371-373 employ checksums 412 of the same length, but encoded according to the different coding scheme. Alternatively or additionally, different redundancy versions may employ different interleaving schemes. Alternatively or additionally, different redundancy versions may employ different puncturing schemes.

Hereinafter, an example implementation of constructing different redundancy versions is given.

STEP 1 of constructing different redundancy versions: A block of information bits, i.e., the raw signal 411 to be transmitted, is encoded. Here, additional redundancy bits are generated, i.e., in addition to the signal 411. Let N denote the number of information bits; then—e.g., for E-UTRA RAT—the total number of the encoded bits (i.e., the sum of information bits and redundancy bits) may amount to 3N. A decoder that receives all 3N bits typically is able to decode the information bits, even if a large number of bit errors is present in the received bits due to a high BER.

STEP 2 of constructing different redundancy versions: Thus, in order to avoid excessive overhead of transmission, only a fraction of the redundancy bits is selected. The information bits and the selected redundancy bits form the first redundancy version 371. The amount of encoded bits according to the first redundancy version is 371 therefore, using the above example, somewhere between N and 3N. The process of removing redundancy bits by selecting the fraction is sometimes referred to as puncturing. This first redundancy version 371 may then be sent to the receiver.

STEP 3 of constructing different redundancy versions: In case a retransmission is required according to the HARQ protocol, a new redundancy version 372, 373 is sent. The higher order redundancy version 372, 373 includes additional redundancy bits from the ones that were previously punctured in step 2, and typically the same information bits again. In this way, after a couple of repetitions the whole 3N bits have been sent at least once.

According to examples, each transmission burst 350 includes a plurality of repetitions 371 of the encoded signal 401-403 being encoded according to the same redundancy version 371-373.

Figure 5:
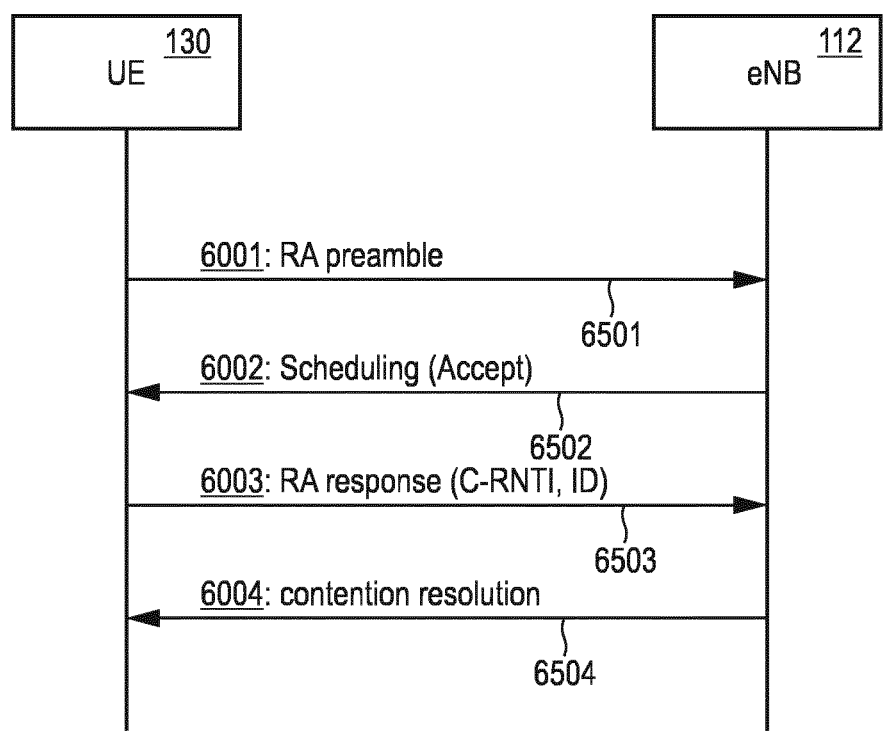
FIG. 5 is a signaling diagram of wireless communication between a UE and a BS of the network for RA of the UE to the network according to various examples.

FIG. 5 schematically illustrates aspects with respect to a RA procedure. The RA procedure includes of four steps, starting with a RA preamble 6001 from the UE 130 to the eNB 112 in 6501. This is followed in 6502 by a RA response including an uplink scheduling command 6002; this is addressed to the UEs 130 RA Radio Network Temporary Identity (RA-RNTI). The UE 130 then, at 6503, sends a connection request message 6003 including a Cell Radio Network Temporary Identity (C-RNTI). The eNB responds with a contention resolution message 6004 at 6504 and any potential contention between other UE's may be resolved.

The message 6004 may be scheduled 3 subframes after the RA preamble 6001, and, e.g., for a duration of up to 10 ms, and up to 400 ms in CE. If the connection attempt of the UE 130 to the network 100 is successful, the data connection 160 may be established. Then, wireless communication of payload UL data and/or payload DL data along the data connection 160 can commence.

In the example of FIG. 5, the message 6002 may also be indicative of rejection of the connection attempt of the UE 130 to the network 100 and, as such, may implement a connection reject control message. Alternatively or additionally, a Radio Resource Control (RRC) control message transmitted during a RRC set-up procedure for setting up the data connection 160 (not shown in FIG. 5) may be indicative of the network 100 rejecting the connection attempt of the UE 130. Such negative response messages 6002 may be referred to as a failure event, because the connection attempt of the UE 130 to the network 100 fails.

For example, such a rejection of the connection attempt of the UE 130 to the network 100 may be due to a flooding scenario. Various examples described herein are based on the finding that such flooding situations may, in particular, occur for UEs 130 employing CE. Furthermore, such flooding situations may, in particular, occur in response to lifting an AB.

There are various trigger criteria conceivable for the RA procedure. Examples include reception of a network paging message by the UE 130 or of a wake-up signal. Further examples include UL payload data scheduled for transmission to the network 100. Further examples include a transition of the UE 130 from an idle mode to a connected mode, e.g., RRC idle to RRC connected in 3GPP LTE.

Figure 6:
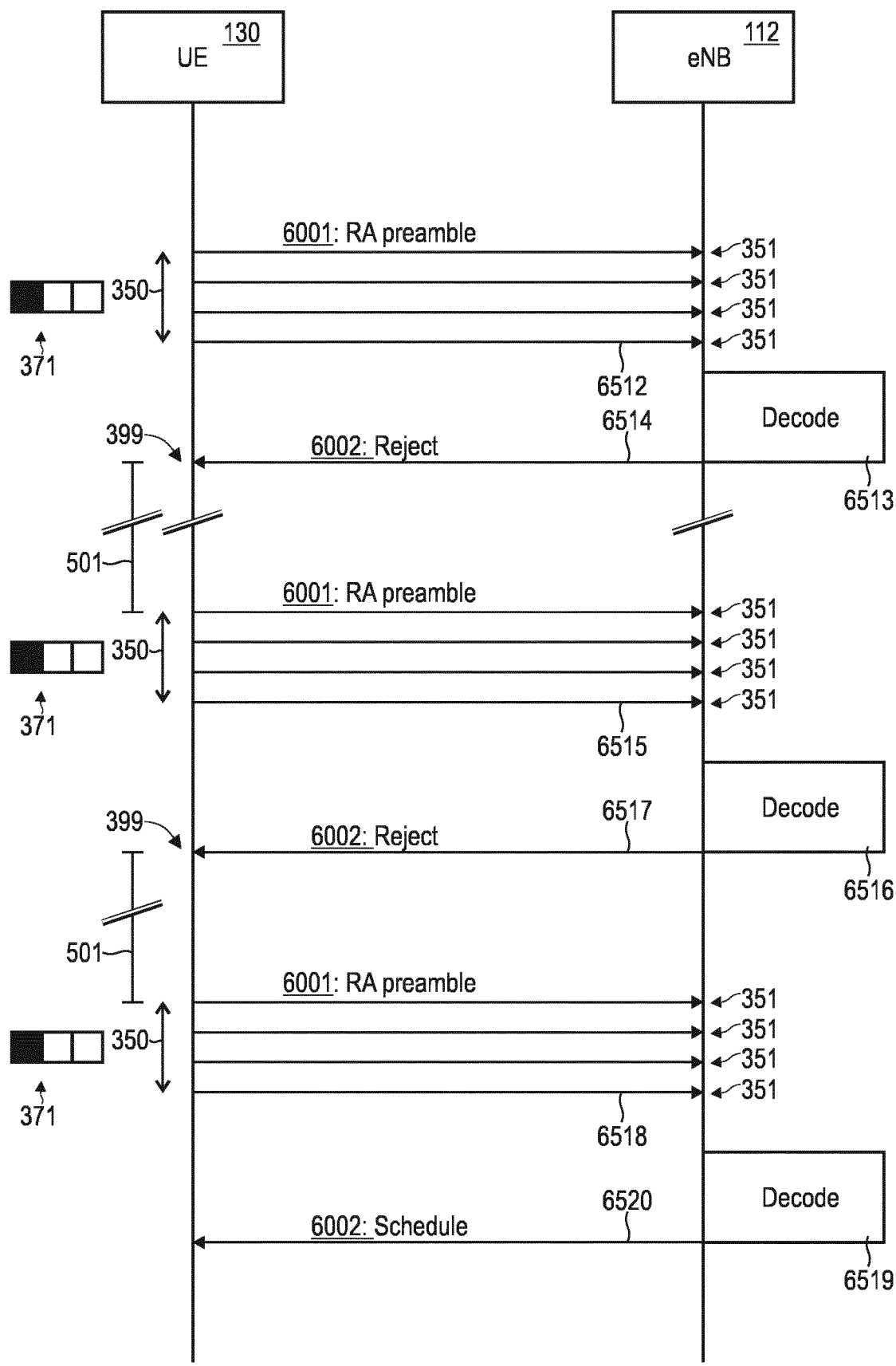
FIG. 6 is a signaling diagram of wireless communication between a UE and a BS of the network for RA of the UE to the network according to various examples.

FIG. 6 is a signaling diagram of wireless communication between the UE 130 and the BS 112. FIG. 6 illustrates aspects with respect to an RA procedure. In 6512, the RA preamble 6001 is transmitted by the UE 130 using multiple repetitions. The RA preamble 6001 is thus transmitted using CE. The RA preamble is encoded according to the redundancy version 371. While in the example of FIG. 6 a count of the repetitions 351 is four, in various examples, other counts of repetitions could be employed, e.g., up to a couple of hundreds or even thousands of repetitions.

The BS 112 combines, in time domain, the received signals corresponding to the multiple repetitions 351 of the RA preamble 6001 and then attempts to decode the RA preamble 6001, 6513, i.e., to reconstruct the transmitted information.

The BS 112 then sends a connection reject control message 6002, which is indicative of a rejection of the connection attempt of the UE 130. For example, the rejection may be due a flooding scenario at the BS 112. In some embodiments the connection reject control message 6002 is a RAR.

Next, the UE 130 implements a back-off time duration 501. After the back-off time duration 501, at 6515, the UE 130 retransmits the RA preamble 6001, again encoded according to the redundancy version 371. After the BS 112 decoding at 6516, another RA response message 6002 rejecting the connection attempt of the UE 130 is transmitted by the BS 112 at 6517.

After this second failure event, the UE 130 again implements a back-off time duration 501 and, eventually, transmits, at 6518, another RA preamble 6001 encoded according to the redundancy version 371. After decoding at 6519, the BS 112 finally sends a RA response message 6002 which accepts the connection attempt of the UE 130 at 6520. Then, control signaling for setting up the data connection 160 may commence (not illustrated in FIG. 6].

In the example of FIG. 6, only a single repetition of the RA response messages 6002 is transmitted by the BS 112; in other examples, multiple repetitions of the RA response message 6002 encoded according to the same redundancy version could be employed by the BS 112.

In the example of FIG. 6, the same RA preamble 6001 is retransmitted at 6512, 6515, and 6518. In other examples, different RA preambles may be transmitted prior to and after the respective back-off time durations 501.

In the example of FIG. 6, the back-off time duration 501 is triggered by a failure event 399 corresponding to the reception of the connection reject control message 6002. In other examples, the back-off time duration 501 could be triggered by a change in the AB state, e.g., from barred to un-barred. In other examples, the back-off time duration could be triggered by the UE 130 not receiving a RAR. In other examples, it could also be possible to trigger the back-off time duration 501 by reception of another control message, e.g., by reception of a RRC connection reject message in response to an RRC connection request. The RRC connection setup typically follows the RA procedure, but is not shown in FIG. 6. For example, according to 3GPP TS 36.331, a timer T302 is started. Here, instead of using this timer T302, the back-off time duration 501 according to the examples described herein could be used.

Figure 7:
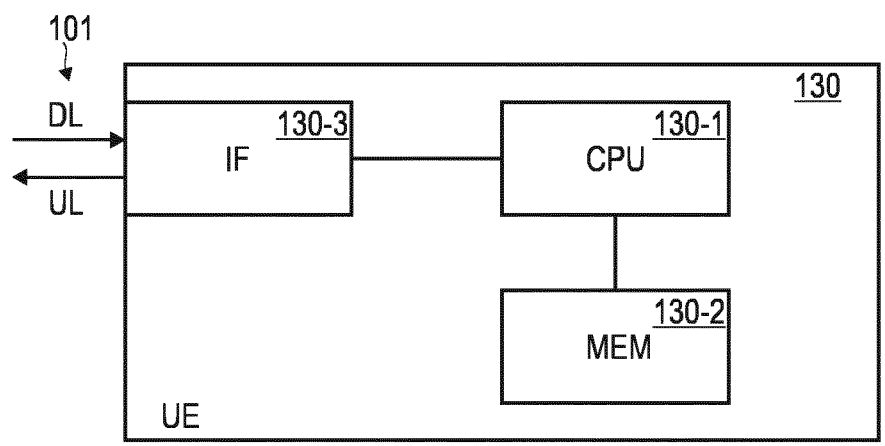
FIG. 7 schematically illustrates the UE according to various examples.

FIG. 7 schematically illustrates the UE 130. The UE 130 includes control circuitry implemented by a processor 130-1, e.g., a single core or multicore processor. Distributed processing may be employed. The processor 130-1 is coupled to a memory 130-2, e.g., a non-volatile memory. The memory 130-2 may store program code that is executable by the processor 130-1. Executing the program code may cause the processor 130-1 to perform techniques as disclosed herein, e.g., relating to: CE; setting and implementing a back-off time duration; communicating on an open spectrum; etc. Such functionality which is illustrated with respect to the processor 130-1 in the example of FIG. 10, in other examples may also be implemented using hardware. The UE 130 also includes an interface 130-3 configured to communicate with the BS 112 on the wireless link 101. The interface 130-3 may include an analog front end and/or a digital front end. The interface 130-3 may implement a transmission protocol stack, e.g., according to the 3GPP LTE technology. The transmission protocol stack may include a physical layer (Layer 1), a MAC layer (Layer 2), etc.

Figure 8:
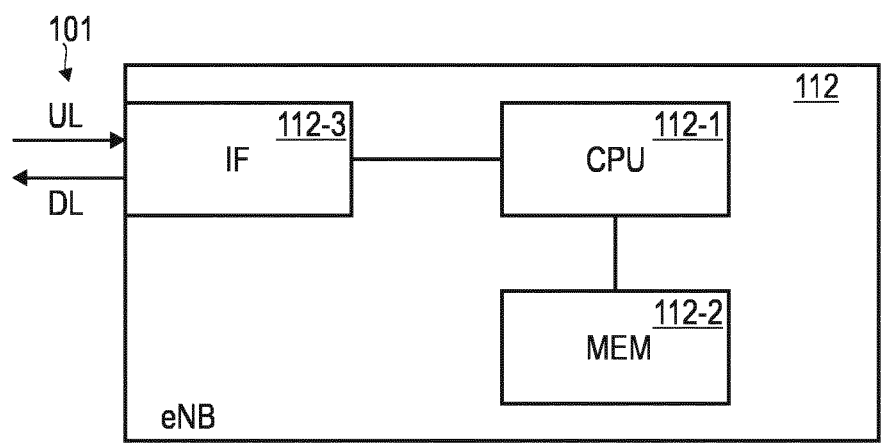
FIG. 8 schematically illustrates the BS according to various examples.

FIG. 8 schematically illustrates the BS 112. The BS 112 includes control circuitry implemented by a processor 112-1, e.g., a single core or multicore processor. Distributed processing may be employed. The processor 112-1 is coupled to a memory 112-2, e.g., a non-volatile memory. The memory 112-2 may store program code that is executable by the processor 112-1. Executing the program code can cause the processor 112-1 to perform techniques as disclosed herein, e.g., relating to: CE; setting and implementing a back-off time duration; and transmitting and/or receiving on an open spectrum. Such techniques as illustrated with respect to FIG. 11 for the processor 112-1 and the memory 112-2 may also be implemented partly or fully in hardware in other examples. The BS 112 also includes an interface 112-3 configured to communicate with the UE 130 on the wireless link 101. The interface 112-3 may include an analog front end and/or a digital front end. The interface 112-3 may implement a transmission protocol stack, e.g., according to the 3GPP LTE technology. The transmission protocol stack may include a physical layer (Layer 1), a MAC layer (Layer 2), etc.

Figures 9A, 9B:
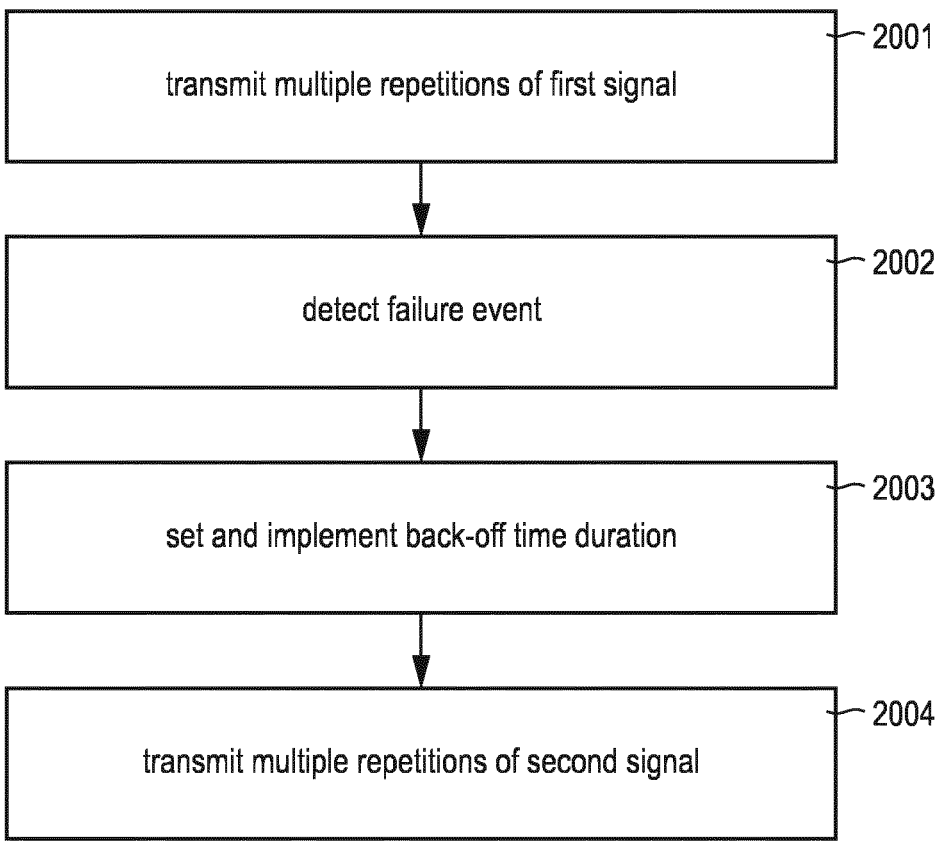
FIG. 9A is a flowchart of a method according to various examples.
FIG. 9B is a flowchart of a method according to various examples.

FIG. 9A is a flowchart of a method according to various examples. For example, the flowchart of the method according to FIG. 9A could be executed by the control circuitry of the UE 130 and/or by the control circuitry of the BS 130.

In 2101, a back-off time duration is set based on a count of multiple repetitions of a signal. Hence, the back-off time duration may be set based on a CE level.

For example, the method may further include implementing the back-off time duration, e.g., in response to a change of an AB state. For example, if the AB state is changed from barred to un-barred for a given UE, then, the back-off time duration may be implemented.

FIG. 9B is a flowchart of a method according to various examples. For example, the flowchart of the method according to FIG. 9B could be executed by the control circuitry of the UE 130 and/or by the control circuitry of the BS 130.

First, in 2001, multiple repetitions of a first signal are transmitted. For example, the first signal may correspond to an RA preamble. For example, the multiple repetitions of the first signal may be encoded according to one and the same first redundancy version.

Next, in 2002, a failure event is detected. For example, the failure event may correspond to receiving a connection reject control message (not illustrated in FIG. 9B), e.g., as part of a RA procedure. Alternatively or additionally, the failure event may correspond to not receiving a response message to the first signal. The transmitting of the first signal may impose an expected response to the first signal, e.g. as a RA response message, and the failure event may be detected by means of not receiving such message during an expected response reception time frame. Such failure event may occur due to the receiver of the first message may not have been able to detect or decode the first message and therefore may not transmit a response message such as a RA response message. Alternatively or additionally the failure event may correspond to receiving but not being able to detect or decode a response message to the first signal. The transmitting of the first signal may impose an expected response, e.g. as a RA response message, and a failure event may be detected by means of not being able to fully detect or decode such response message, although such response message is transmitted. Alternatively or additionally, the failure event may correspond to sensing access of at least one remote device to shared resources of an open spectrum. Other failure events are possible. For example, the failure event may correspond to a control message which indicates a flooding scenario of the network, i.e., an overload or congestion situation.

In some examples, there may be multiple subsequent failure events. For example, multiple subsequent connection attempts of a UE to a network may be rejected.

Next, in 2003, a back-off time duration is set and, subsequently, implemented. Hence, execution of 2004—where multiple repetitions of a second signal are transmitted—is delayed by said implementing of the back-off time duration. It is possible that the second signal transmitted in 2004 corresponds to the first signal transmitted in 2001. It is also possible that the second signal transmitted in 2004 is encoded according to one and the same second redundancy version; here, the second redundancy version may be equal to the first redundancy version optionally used for encoding the first signal in 2001.

Sometimes, the second signal transmitted in 2004 may be equal to the first signal transmitted in 2001, e.g., may correspond to the same RA preamble. Sometimes, the second signal transmitted in 2004 may be different from the first signal transmitted in 2001. It is possible that the count of the multiple repetitions of the second signal transmitted in 2004 differs from the count of the multiple repetitions of the first signal transmitted in 2001. In other examples, it is possible that the count of the multiple repetitions of the second signal transmitted in 2004 equals the count of the multiple repetitions of the first signal transmitted in 2001. For example, different counts of the multiple repetitions may be implemented in 2001 and 2004 if the CE level changes between executing 2001 and 2004.

The back-off time duration is set based on a count of the multiple repetitions in 2001 and/or the count of the multiple repetitions in 2004. This may correspond to setting the back-off time duration based on a CE level employed for transmitting the multiple repetitions in 2001 and/or 2004.

Alternatively or additionally, it may also be possible to set the back-off time duration based on a count of multiple failure events, e.g., on multiple failure events in succession, etc.

Hereinafter, various examples will be described with respect to setting the back-off time duration in 2003.

Figure 10:
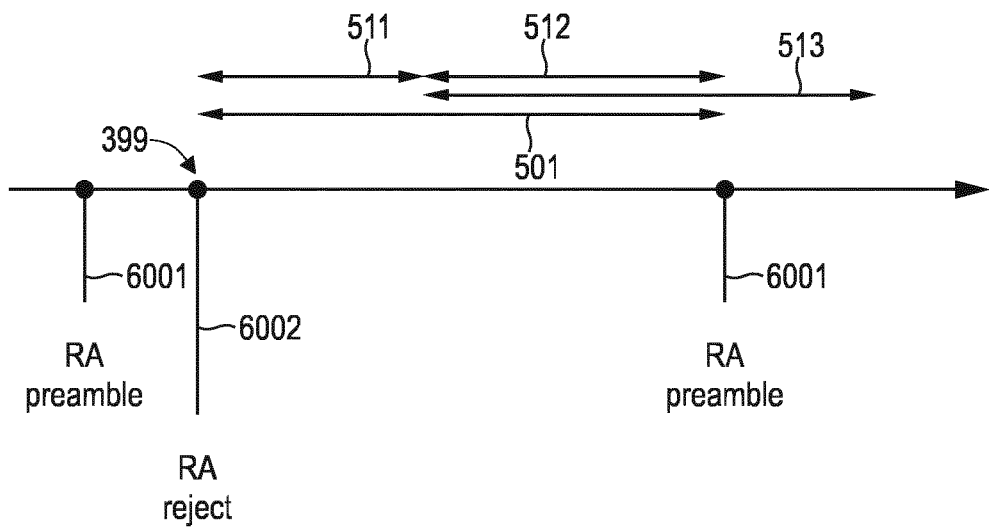
FIG. 10 schematically illustrates setting a back-off time duration according to various examples.

FIG. 10 schematically illustrates aspects with respect to setting a back-off time duration 501. In the example of FIG. 10, the back-off time duration 501 is set based on a CE level 352 used for transmitting the RA preamble 6001.

The RA preamble 6001 may be transmitted using multiple repetitions, i.e., the RA preamble 6001 may be transmitted using a certain CE level 352. A connection reject control message 6002 is received by the UE 130. This corresponds to a failure event, because the connection attempt of the UE 130 is rejected by the network. In response to detecting this failure event 399 based on the connection reject control message 6002, a back-off time duration 501 is implemented. After the back-off time duration 501, the radio access preamble 6001 may be re-transmitted. Again, the radio access preamble 6001 may be re-transmitted using multiple repetitions. In some examples, it would be possible that a different radio access preamble 6001 is re-transmitted after the back-off time duration 501.

In the example of FIG. 10, the back-off time duration 501 is set based on the CE level 352 used for transmitting the multiple repetitions of the RA preamble 6001. This imposes a restriction on the time before the UE 130 makes a further connection attempt using retransmission of the RA preamble 6001. According to some examples, such techniques of using a CE-level-based RA back-off time duration can be employed instead of AB.

These techniques are based on the finding that using a high CE level 352 for transmission of the RA preamble 6001 can result in significant capacity demands on the wireless link 101. This is because each transmission is repeated a large number of times. By implementing the CE-level-based RA back-off time duration, it is possible to avoid frequent access attempts by UEs 130 using a high number of repetitions 351. Such UEs 130 can be deprioritized, at least implicitly by implementing a tendency for longer back-off time durations 501; this, in turn, may improve the system throughput, e.g., in terms of a number of UEs that can successfully connect to the network.

In the example of FIG. 10, the back-off time duration 501 is set based on a lower point in time 511. The lower point in time 511 defines a baseline with respect to which a randomized value 512 is defined. The sum of the lower point in time 511 and the randomized value 512 equals the back-off time duration 501. By using the randomized value 512, separation of multiple devices in contention-based procedures is achieved.

In the example of FIG. 10, furthermore, an upper point in time 513 is taken into account; this is optional. The upper point in time 513 may define a time duration which should not be exceeded by the back-off time duration 501. Hence, the randomized value 512 result in a back-off time duration 501 varying between the durations defined by the point in times 511, 513.

In the example of FIG. 10, typical timescales of the lower point in time 511 and/or the upper point in time 513 may be in the order of seconds. In some examples, it is possible to either employ the lower point in time 511 or the upper point in time 513.

In some examples, the lower point in time 511 and/or the upper point in time 513 may be dependent on the CE level 352. Hence, the dependency of the back-off time duration 501 on the count 352 the multiple repetitions 351 may be modeled via such a dependency of one or two of the points in time 511, 513 on the count of the repetitions 351.

backoff time duration 501=*CE* level 352×timer_*X*+ Randomized value 512

Here, CE level 352×timer_X corresponds to the lower point in time 511.

The randomized value 512 may vary between 0 and the upper point in time 513. The upper point in time, in turn, may be defined by: CE level 352×timer_Y.

Timer_X and/or timer_Y may be selected in order to distribute the connection attempts according to the current network load. Timer_X and/or timer_Y may be network-defined by the network 100, e.g., by the BS 112. Thus, Timer_X and Timer_y may relate to reference timer values.

For example, it may be possible to specify timer_X and/or timer_Y as part of a back-off policy which specifies these reference timer values. A respective configuration control message may be received, e.g., from the BS 112. Then, the back-off time duration 501 may be set based on the reference timer values and the count of the multiple repetitions 351, e.g., based on a combination thereof according to the multiplications as indicated above.

Figure 11:
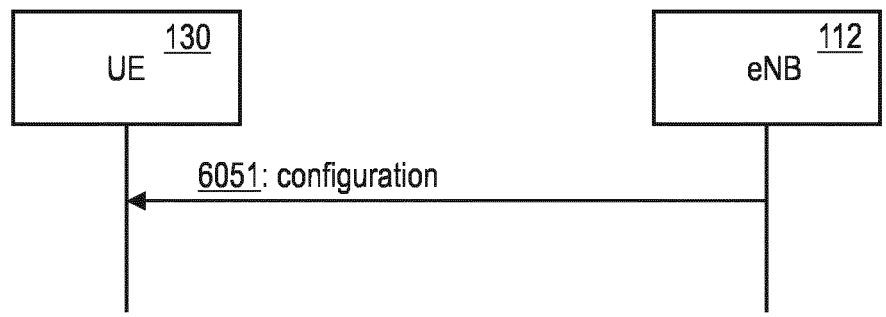
FIG. 11 is a signaling diagram of wireless communication between the UE and the BS according to various examples, wherein FIG. 11 schematically illustrates wireless communication of a downlink configuration control message from the BS to the UE.

FIG. 11 illustrates wireless communication between the UE 130 and the BS 112. Generally, it is possible that the UE 130 receives a configuration control message 6051 indicative of the back-off policy. Then, the back-off time duration 501 can be further set based on the back-off policy.

By implementing the setting of the back-off time duration 501 at least partially network-controlled by means of the back-off policy, it is possible to tailor the back-off procedure to the current congestion environment encountered.

Figure 12:
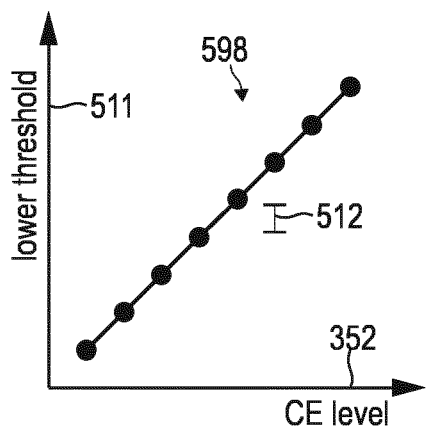
FIG. 12 schematically illustrates a dependency of a lower threshold of back-off time duration on the count of repetitions of the encoded signal according to various examples.

FIG. 12 schematically illustrates aspects with respect to a back-off policy 598. The back-off policy 598, in the example of FIG. 12, specifies a dependency of the lower point in time 511 on the CE level 352. In particular, in the example of FIG. 12, this dependency is linear; however, in other examples, other qualitative dependencies may be applied, e.g., a quadratic or polynomial dependency.

Furthermore, FIG. 12 illustrates an example, where the available CE levels 352 are discretized. Hence, different UEs 130 belong to different groups which are associated with a specific CE level 352 from the discretized set.

Such a discretized distribution of the available CE levels 352 may be used in order to specify a separation of the back-off time durations 501 in time domain by means of the back-off policy 598.

For example, in FIG. 12, the slope of the linear dependency between the lower point in time 511 and the CE level 352 can be steep enough so that—even taking into account the randomized value 512—non-overlapping ranges for potential values of the back-off time duration 501 result (cf. indication of the randomized value 512 in FIG. 12). In other words: the increment between the lower points in time 511 of neighboring CE levels 352 is larger than the maximum that the randomized value 512 can take, e.g., defined by the upper point in time 513 (not shown in FIG. 12). Such an example is illustrated in FIG. 13.

Figure 13:
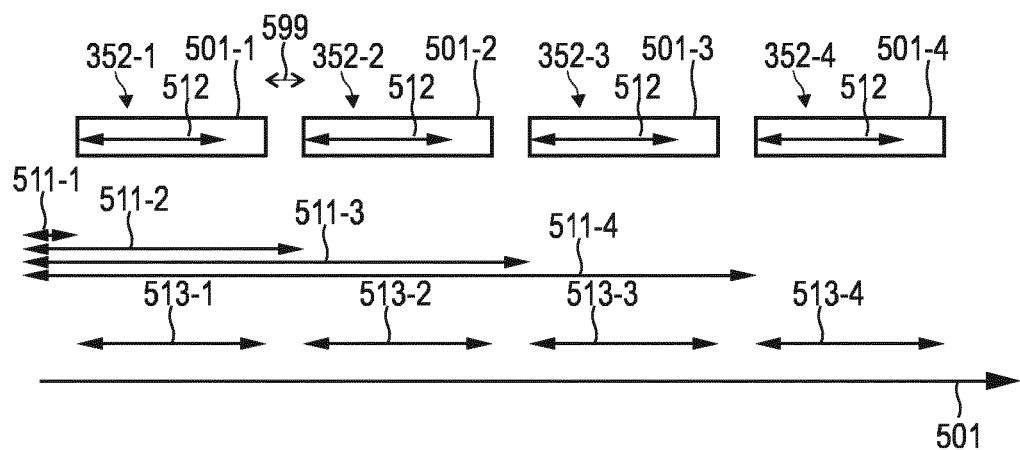
FIG. 13 schematically illustrates a separation of the back-off time durations associated with different counts of the multiple repetitions in time domain according to various examples.

FIG. 13 illustrates the available ranges of the back-off time duration 501-1-501-4 for different CE levels 352-1-352-4. By selecting the available range of the randomized value 512 to be smaller than the increment between the lower points in time 511-1-511-4 of neighboring CE levels 352-1-352-4, the separation 599 in time domain between the back-off time durations 501 is achieved. This may be achieved by appropriately setting the upper points in time 513-1-513-4 associated with the various CE levels 352-1-352-4. This may be achieved by appropriately setting the values of timer_X and/or timer_Y according to the back-off policy 598. Such a separation 599 of the back-off time durations 501-1-501-4 associated with different CE levels 352-1-352-4 may enable prioritization of the lower CE levels 352-1, 352-2 vis-à-vis the higher CE levels 352-3, 352-4.

Above, various decision criteria for setting the back-off time duration 501 have been discussed. In other examples, further or different decision criteria can be taken into account. For example, it would be possible to set the back-off time duration based on a UE device type or an establishment cause value. For example, the UE 130 may transmit the control message 6003 or another control message during the RA procedure which is indicative for a reason of attempting to set up the data connection and accessing the network 100. Example reasons could be transmission of UL data, UE mobility, reception of a paging message from the network 100, etc. For example, it would be possible that the back-off time duration 501 is further set based on a count of failure events. For example, there may be a tendency that the back-off time duration 501 is set to be smaller (larger) for larger (smaller) counts of the failure events 399. For example, if there have been multiple rejections of a connection attempt of the UE 130 to the network 100—e.g., by means of the message 6002—, there may be a tendency to implement smaller back-off time durations 501. This tendency may be modelled, e.g., by reducing the value of the timer_X and/or of the timer_Y.

Figure 14:
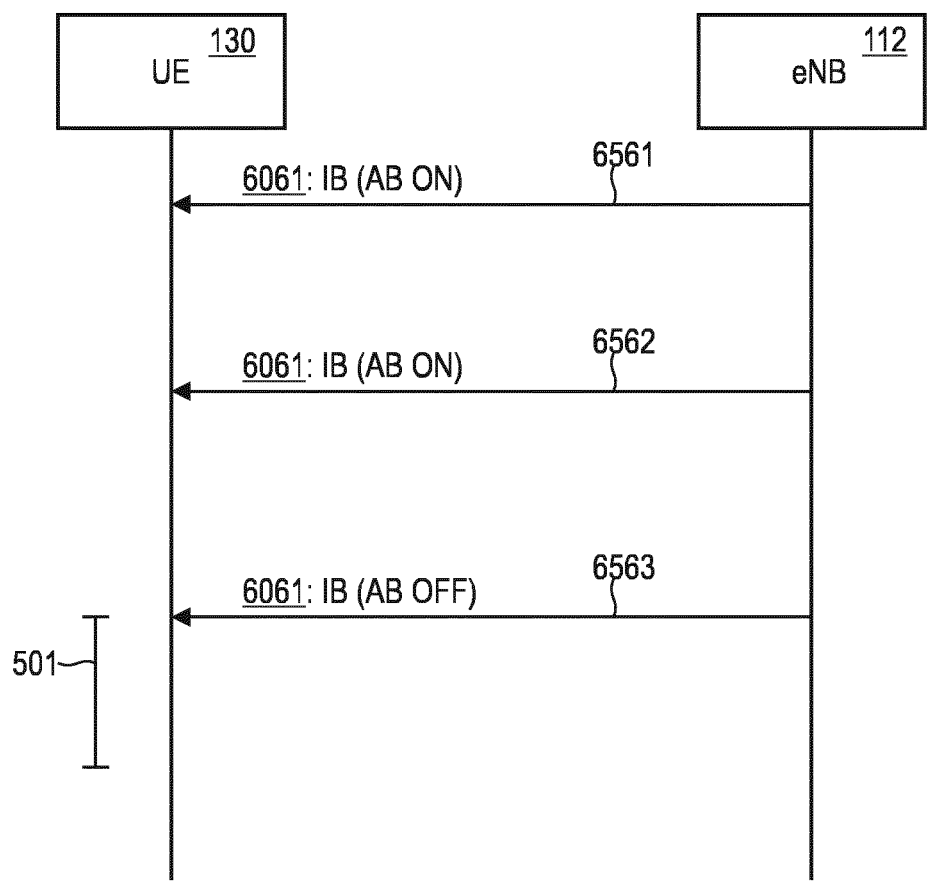
FIG. 14 is a signaling diagram of wireless communication between the UE and the BS according to various examples, wherein FIG. 14 schematically illustrates wireless communication of an AB state.

FIG. 14 is a signaling diagram illustrating wireless communication between the UE 130 and the BS 112. FIG. 14 illustrates aspects with respect to AB.

In FIG. 14, the BS 112 repeatedly broadcasts information blocks 6061. At 6561 and 6562, the information blocks 6061 indicate that AB is active, e.g., according to ACB for a device group to which the UE 130 belongs to. Therefore, the UE 130 refrains from making a connection attempt to the network 100. Hence, the UE 130 does not transmit an RA preamble 6001.

After a while, the BS 112 transmits the information block 6061 at 6563 which is now indicative of the AB having been lifted.

Reception of the information block 6061 triggers the back-off time duration 501. A corresponding timer may be initialized. The back-off time duration 501 is dependent on the CE level 352. For example, techniques for setting the back-off time duration 501 as explained in various examples herein may be employed. For example, the techniques for setting the back-off time duration as explained in FIGS. 12 and 13 may be employed.

Then, after the back-off time duration 501, the UE 130 can make a connection attempt, e.g., by transmitting the RA preamble 6001 to the BS 112. For example, the RA procedure according to FIG. 5 or 6 may commence after the back-off time duration 501.

Generally, the UE 130 may be configured to monitor the AB state, e.g., by listening for broadcast information blocks 6061. Then, the transmitting of the multiple repetitions 351 of the RA preamble 6001 can be selectively executed depending on said monitoring.

Figure 15:
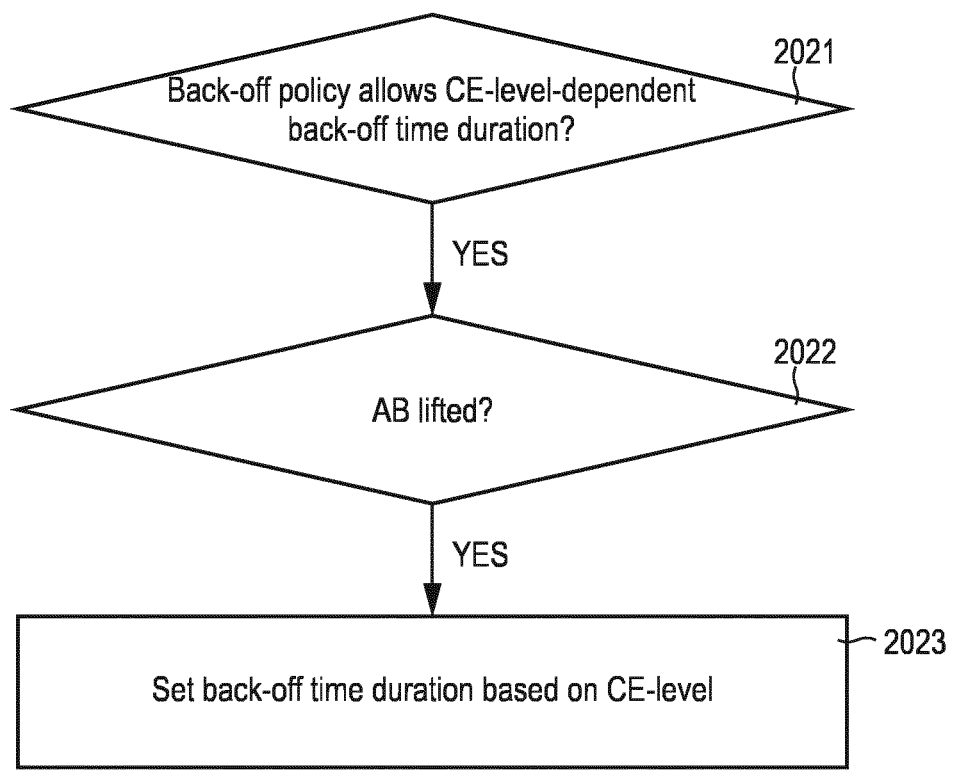
FIG. 15 is a flowchart of a method according to various examples.

FIG. 15 is a flowchart of a method according to various examples. FIG. 15 illustrates aspects with respect to activating the CE-level-based back-off time duration 501.

Generally, in the various examples described herein, the CE-level-based back-off time duration 501 may be activated for certain types of UEs 130, e.g. for specific UE categories. Here, no explicit signaling to activate the CE-level-based back-off time duration 501 is needed. Instead, the CE-level-based back-off time duration 501 is always used for certain types of UE:s, e.g. in the event of a failed RA attempt. Alternatively or additionally, in the various examples described herein, the network can activate the CE-level-based back-off time duration 501 by SIB. The values of timer_x and timer_y may be included in the SIB as parameters, be fixed, or pre-configured. If they are fixed or pre-configured an indicator (flag) is sufficient in the SIB.

Alternatively or additionally, the CE-level-based back-off time duration 501 can be activated upon a change in the AB state, e.g., from barred to un-barred.

In the method according to the example of FIG. 15, first, in 2021, it is checked whether a network-specified back-off policy allows activation of the CE-level-based back-off time duration 501. Here, a configuration control message may be received from the network which is indicative of the back-off policy (cf. FIG. 11: control message 6051; or a SIB).

If, in 2021, it is judged that the CE-level-based back-off time duration 501 may be activated, next, in 2022 it is checked whether recently the AB has been lifted. Hence, it is possible that the AB state is monitored and the set of the back-off time duration based on the CE level is selectively executed depending on said monitoring.

If, at 2022 it is judged that the AB has been lifted, then, in 2023, the back-off time duration is set based on the CE level. This CE level may be defined by the CE policy.

In some examples either 2021 or 2022 could be executed.

According to the example method of FIG. 15, it is possible to minimize the immediate high-load situation which may occur when a group of UEs—which had been previously barred—attempt to connect to the network in response to a lift of the barring. When a system information message is updated with deactivation of the AB, the previously barred UEs may attempt to access the network substantially contemporaneously. Then, by means of selectively setting the back-off time duration based on the CE level 352 in response to such a change of the AB state, it is possible that the access attempts of those UEs are delayed and distributed in time. This may be done based on the CE-level-based back-off time duration 501, as described in the various examples herein.

Figure 16:
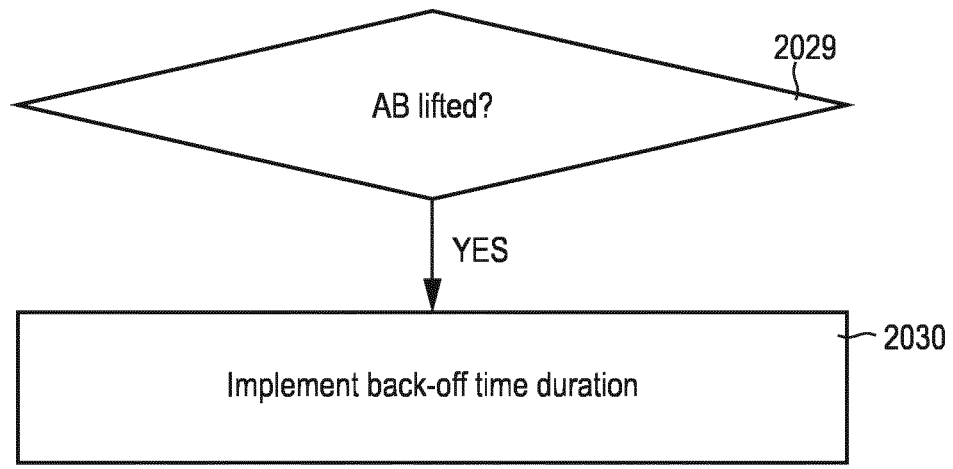
FIG. 16 is a flowchart of a method according to various examples.

FIG. 16 is a flowchart of a method according to various examples. In 2029, it is checked whether AB has been lifted, i.e., whether the AB state changed from barred to un-barred.

If AB has been lifted, in 2030, a back-off time duration is implemented. The back-off time duration depends on the CE level. For example, larger (smaller) CE levels may result in larger (smaller) back-off time durations.

Optionally, after the back-off time duration, a connection attempt may be made to the network. For example, a RA preamble may be transmitted to the network. Here, multiple repetitions of the RA preamble may be transmitted according to CE.

Such techniques enable to trigger the CE-level-dependent back-off time duration in response to a change of the AB state. Thereby, flooding scenarios can be mitigated where the AB state is changed to un-barred for a large number of UEs.

Summarizing, above techniques of setting a back-off time have been described. During the back-off time, access to resources may be prohibited for one or more wireless devices. It may be possible that transmission is prohibited. After the back-off time, transmission may be allowed.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, while various examples have been described for cellular networks, similar techniques may be readily implemented for other kinds of networks, e.g., point-to-point networks.

For further illustration, various examples have been describe where the same signals may be retransmitted after a back-off time duration. However, the various examples may also be modified such that different signals are transmitted prior to and after the back-off time duration.

For further illustration, while various examples have been described above with respect to implementing the back-off time duration which is dependent on the CE level in the context of a connection attempt of a UE to the network, in other examples, it would also be possible to implement a CE-level-based back-off time duration in other use cases. For example, it would be possible that multiple repetitions of a first signal and—after a back-off time duration—multiple repetition of a second signal are transmitted in shared resources of an open spectrum. Here, a CSMA/CA technique may be employed. For example, it would be possible to sense access of at least one remote device to the shared resources. Then, a failure event—which triggers implementation of the back-off time duration prior to transmitting a second signal—may be detected based on said sensing of the access of the at least one remote device to the shared resources in the open spectrum. In particular, in such a scenario, it may be possible that the same signal is re-transmitted after the back-off time duration, because it can be assumed that multiple access attempts to the shared resources can result in a transmission failure of the signal in the first transmission attempt. Also, in such a scenario it may be particularly beneficial if the various transmission attempts of the signal are encoded according to the same redundancy version. Then, the received signals associated with the various transmission attempts of the signal can be combined at the receiver to increase a likelihood of successfully decoding the signal.

The invention claimed is:

1. A method, comprising:
   determining a count of multiple repetitions of a signal; and
   setting a back-off time duration based on the count of the multiple repetitions of the signal,
   wherein transmission of the multiple repetitions of the signal is allowed after the back-off time duration, and
   wherein the back-off time duration is set as:
   CE level×timer_X+Y,
      wherein CE level corresponds to the count of the multiple repetitions,
      wherein timer_X corresponds to a lower point in time, and
      wherein Y corresponds to a randomized value.

2. The method of claim 1, further comprising:
   transmitting further multiple repetitions of the signal or transmitting multiple repetitions of a further signal,
   detecting at least one failure event in response to said transmitting of the further multiple repetitions of the signal or said transmitting of the multiple repetitions of the further signal, and
   in response to said detecting of the failure event: after the back-off time duration, transmitting the multiple repetitions of the signal.

3. The method of claim 2,
wherein the further signal comprises a random-access preamble for connecting to a wireless network, and/or
wherein the signal comprises the random-access preamble or a further random-access preamble for connecting to the network.

4. The method of claim 2, further comprising:
in response to said transmitting of the further multiple repetitions of the signal or said transmitting of the multiple repetitions of the further signal: receiving a connection reject control message, and
detecting the at least one failure event based on the connection reject control message.

5. The method of claim 2,
wherein the further multiple repetitions of the signal or the multiple repetitions of the further signal are transmitted on shared resources of an open spectrum.

6. The method of claim 5, further comprising:
sensing access of at least one remote device to the shared resources,
wherein the failure event is detected based on said sensing of the access.

7. The method of claim 2,
wherein the back-off time duration is further set based on a count of the at least one failure event.

8. The method of claim 1, wherein the count of the multiple repetitions are determined based on a coverage enhancement policy.

9. The method of claim 1,
wherein the lower point in time and the upper point in time are dependent on the count of the multiple repetitions,
wherein multiple back-off time durations constrained by the respective lower points in time and the respective upper points in time are separated in time-domain for different counts of the multiple repetitions.

10. The method of claim 1, further comprising:
receiving a configuration control message indicative of a back-off policy,
wherein the back-off time duration is further set based on the back-off policy,
wherein the configuration control message is optionally a broadcasted system information block.

11. The method of claim 10,
wherein the back-off policy specifies at least one reference timer value,
wherein the back-off time duration is further set based on at least one combination of the at least one reference timer value and the count of the multiple repetitions.

12. The method of claim 10,
wherein the back-off policy specifies a separation of the back-off time durations associated with different counts of the multiple repetitions in time domain.

13. The method of claim 1,
wherein said setting of the back-off time duration based on the count of the multiple repetitions is selectively executed depending on a device category of the wireless communication device.

14. The method of claim 1, further comprising:
receiving a configuration control message indicative of a back-off policy,
wherein said setting of the back-off time duration based on the count of the multiple repetitions is selectively executed depending on the back-off policy.

15. The method of claim 1, further comprising:
monitoring an access-barring state,
wherein said setting of the back-off time duration based on the count of the multiple repetitions is selectively executed depending on the access-barring state.

16. The method of claim 1, further comprising:
monitoring an access-barring state,
in response to a change in the access-barring state: after the back-off time duration, transmitting the multiple repetitions of the signal.

17. A device comprising control circuitry configured to:
determine a count of multiple repetitions of a signal; and
set a back-off time duration based on the count of the multiple repetitions of the signal,
wherein transmission of the multiple repetitions of the signal is allowed after the back-off time duration, and
wherein the back-off time duration is set as:
CE level×timer_X+Y,
wherein CE level corresponds to the count of the multiple repetitions,
wherein timer_X corresponds to a lower point in time, and
wherein Y corresponds to a randomized value.

18. A method, comprising:
transmitting multiple repetitions of a first signal,
detecting at least one failure event in response to said transmitting of the multiple repetitions of the first signal,
after a back-off time duration, transmitting multiple repetitions of a second signal or transmitting further multiple repetitions of the first signal,
wherein the back-off time duration is set as:
CE level×timer_X+Y,
wherein CE level corresponds to the count of the multiple repetitions,
wherein timer_X corresponds to a lower point in time, and
wherein Y corresponds to a randomized value.

19. A device comprising control circuitry configured to perform:
transmitting multiple repetitions of a first signal,
detecting at least one failure event in response to said transmitting of the multiple repetitions of the first signal,
after a back-off time duration, transmitting multiple repetitions of a second signal or transmitting further multiple repetitions of the first signal,
wherein the back-off time duration is set as:
CE level×timer_X+Y,
wherein CE level corresponds to the count of the multiple repetitions,
wherein timer_X corresponds to a lower point in time, and
wherein Y corresponds to a randomized value.

* * * * *